United States Patent
Wu et al.

(10) Patent No.: US 9,653,202 B2
(45) Date of Patent: May 16, 2017

(54) POWER CONVERTER AND DEVICE INTEGRATING INDUCTORS IN PARALLEL OF THE SAME

(71) Applicant: DELTA ELECTRONICS, INC., Taoyuan (TW)

(72) Inventors: Rui Wu, Taoyuan (TW); Jian-Hong Zeng, Taoyuan (TW); Min Zhou, Taoyuan (TW); Yi-Cong Xie, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/093,754

(22) Filed: Apr. 8, 2016

(65) Prior Publication Data

US 2016/0300658 A1 Oct. 13, 2016

(30) Foreign Application Priority Data

Apr. 10, 2015 (CN) .......................... 2015 1 0168948

(51) Int. Cl.
*H02M 3/158* (2006.01)
*H01F 27/24* (2006.01)
*H01F 27/28* (2006.01)
*H02M 1/00* (2006.01)

(52) U.S. Cl.
CPC ......... *H01F 27/24* (2013.01); *H01F 27/2804* (2013.01); *H01F 27/2823* (2013.01); *H02M 3/1584* (2013.01); *H02M 2001/0064* (2013.01); *H02M 2003/1586* (2013.01)

(58) Field of Classification Search
CPC .. H02M 3/04; H02M 2001/0064; H01F 27/24
See application file for complete search history.

(56) References Cited

U.S. PATENT DOCUMENTS

| | | | | |
|---|---|---|---|---|
| 5,077,512 A | * | 12/1991 | Weber | H02P 25/04 |
| | | | | 318/729 |
| 5,260,862 A | * | 11/1993 | Marsh | H02J 3/1864 |
| | | | | 333/174 |
| 6,661,327 B1 | * | 12/2003 | Funk | H01F 27/255 |
| | | | | 29/602.1 |
| 7,688,607 B2 | * | 3/2010 | Schultz | H02J 3/1842 |
| | | | | 363/72 |

(Continued)

FOREIGN PATENT DOCUMENTS

| CN | 101661825 A | 3/2010 |
|---|---|---|
| TW | 291620 B | 11/1996 |

(Continued)

*Primary Examiner* — Matthew Nguyen
*Assistant Examiner* — Yusef Ahmed
(74) *Attorney, Agent, or Firm* — CKC & Partners Co., Ltd.

(57) ABSTRACT

A device is provided that integrates a plurality of inductors in parallel. The device includes a plurality of windings and a magnetic core structure. A number of the windings corresponds to a number of the inductors. The magnetic core structure includes a plurality of windows, wherein each window includes at least two windings coupled with each other. When a phase difference of the voltage phases is smaller than a predetermined value, voltage phases of two terminals of any two of the windings within the same window are substantially the same.

15 Claims, 8 Drawing Sheets

(56) References Cited

U.S. PATENT DOCUMENTS

| | | | |
|---|---|---|---|
| 7,893,806 B1* | 2/2011 | Li | H01F 17/06 336/200 |
| 7,898,379 B1* | 3/2011 | Stratakos | H01F 17/06 336/200 |
| 8,692,644 B2 | 4/2014 | Shudarek et al. | |
| 9,252,656 B2* | 2/2016 | Tong | H02M 1/4241 |
| 2004/0189242 A1* | 9/2004 | Pyntikov | H02P 6/34 318/721 |
| 2005/0194944 A1* | 9/2005 | Folts | H02J 3/1828 323/209 |
| 2006/0197510 A1* | 9/2006 | Chandrasekaran | H02M 3/1588 323/222 |
| 2007/0279022 A1* | 12/2007 | Chen | H02M 3/1584 323/272 |
| 2008/0054874 A1* | 3/2008 | Chandrasekaran | H01F 37/00 323/362 |
| 2008/0246577 A1* | 10/2008 | Sullivan | H01F 17/06 336/184 |
| 2008/0303495 A1* | 12/2008 | Wei | H02M 3/156 323/272 |
| 2009/0179723 A1* | 7/2009 | Ikriannikov | H01F 17/06 336/200 |
| 2009/0289751 A1* | 11/2009 | Nagano | H01F 3/10 336/221 |
| 2010/0327823 A1* | 12/2010 | Nisenblat | H02J 3/1828 323/206 |
| 2011/0035607 A1* | 2/2011 | Ikriannikov | G06F 1/26 713/300 |
| 2011/0169476 A1* | 7/2011 | Ikriannikov | H01F 3/10 323/362 |
| 2011/0279212 A1* | 11/2011 | Ikriannikov | H01F 17/0006 336/192 |
| 2012/0062207 A1* | 3/2012 | Ikriannikov | H01F 38/08 323/361 |
| 2012/0249280 A1* | 10/2012 | Nussbaum | H01F 27/2804 336/192 |
| 2012/0300500 A1* | 11/2012 | Ikriannikov | H01F 3/10 363/16 |

FOREIGN PATENT DOCUMENTS

| | | |
|---|---|---|
| TW | 200721653 A | 6/2007 |
| TW | 201117544 A | 5/2011 |
| TW | 201218223 A1 | 5/2012 |
| TW | I439031 B | 5/2014 |

* cited by examiner

POWER CONVERTER AND DEVICE INTEGRATING INDUCTORS IN PARALLEL OF THE SAME

RELATED APPLICATIONS

This application claims priority to China Application Serial Number 201510168948.2, filed Apr. 10, 2015, which is herein incorporated by reference.

FIELD OF INVENTION

The present disclosure relates to a power technology. More particularly, the present disclosure relates to a power converter and an integrated device of the same.

DESCRIPTION OF RELATED ART

In recent years, miniaturization of power converter is an important trend of the development of power technology. In a power converter, magnetic components occupy a certain degree of the volume and contribute a certain degree of the loss. Therefore, the design and improvement of the magnetic components becomes very important.

In some application scenarios, such as an application with large current condition, a plurality of paths of circuits connected in parallel are used to decrease the occurrence of the ripples. In common designs of the magnetic components, in order to guarantee the unsaturation and low loss of the material, the volume of the magnetic components has to be increased to decrease the strength of the magnetic induction in the magnetic core. As a result, it is a tradeoff between persuading high efficiency and persuading high power density.

Accordingly, what is needed is a power converter and an integrated device of the same to address the above issues.

SUMMARY

The disclosure provides a device integrating a plurality of inductors in parallel. The device includes a plurality of windings and a magnetic core structure. A number of the windings corresponds to a number of the inductors. The magnetic core structure includes a plurality of windows, wherein each window includes at least two windings coupled with each other. When a phase difference of the voltage phases is smaller than a predetermined value, voltage phases of two terminals of any two of the windings within the same window are substantially the same.

Another aspect of the present disclosure is to provide a device integrating a plurality of inductors in parallel. The device includes a plurality of windings and a plurality of independent magnetic core units. A number of the windings corresponds to a number of the inductors. Each magnetic core unit includes at least two windows, and each window includes at least one of the windings, and two neighboring windows share a part of magnetic core. When a phase difference of the voltage phases is smaller than a predetermined value, voltage phases of two terminals of any two of the windings within the same window are substantially the same.

Yet another aspect of the present disclosure is to provide a power converter. The power converter includes a plurality of power conversion circuits, a device integrating a plurality of inductors in parallel and a load. The device includes a plurality of windings and a magnetic core structure. A number of the windings corresponds to a number of the inductors. The magnetic core structure includes a plurality of windows, wherein each window includes at least two windings coupled with each other. When a phase difference of the voltage phases is smaller than a predetermined value, voltage phases of two terminals of any two of the windings within the same window are substantially the same. The load is electrically connected to the output terminals of the plurality of power conversion circuits.

Still another aspect of the present disclosure is to provide a power converter. The power converter includes a plurality of power conversion circuits, a device integrating a plurality of inductors in parallel and a load. The device includes a plurality of windings and a plurality of independent magnetic core units. A number of the windings corresponds to a number of the inductors. Each magnetic core unit includes at least two windows, and each window includes at least one of the windings, and two neighboring windows share a part of magnetic core. When a phase difference of the voltage phases is smaller than a predetermined value, voltage phases of two terminals of any two of the windings within the same window are substantially the same. The load is electrically connected to the output terminals of the plurality of power conversion circuits.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
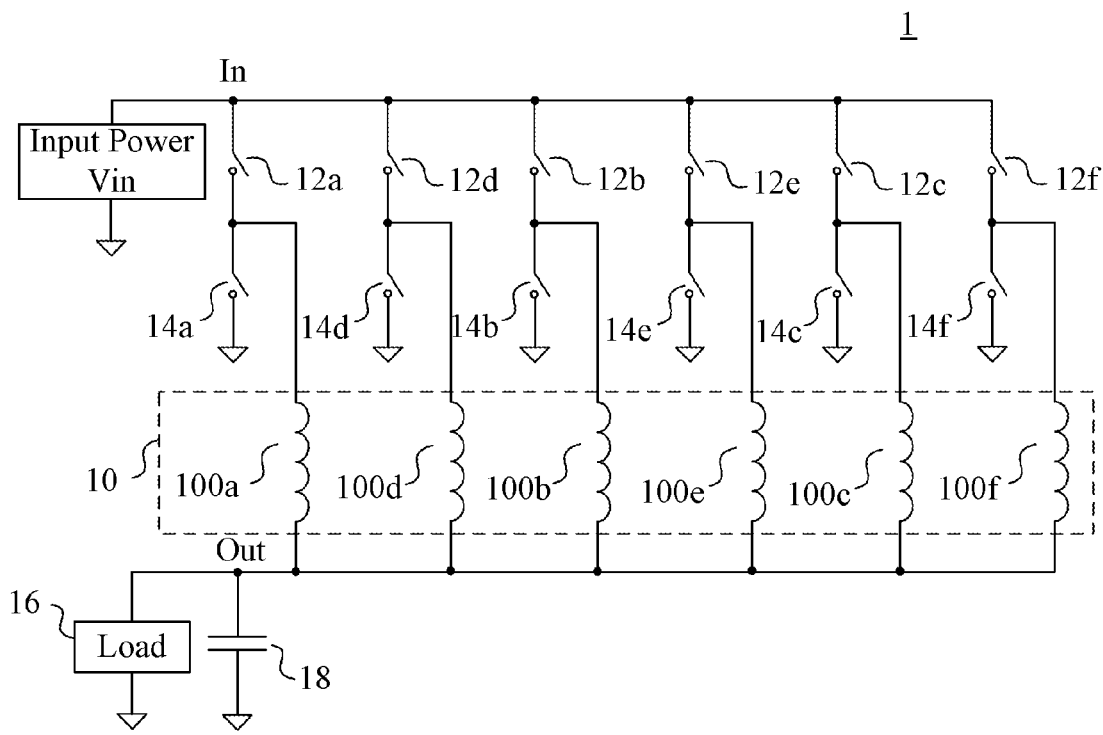
FIG. 1 is a circuit diagram of a power converter in an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is now made to FIG. 1. FIG. 1 is a circuit diagram of a power converter 1 in an embodiment of the present disclosure. The power converter 1 includes an inductor module 10, a plurality of switching devices 12a-12f, 14a-14f and a load 16.

The inductor module 10 is electrically connected to a parallel-connected output terminal OUT of the power converter 1. As a result, the inductor module 10 is the output inductor of the power converter 1 corresponding to the parallel-connected output terminal OUT. The inductor module 10 includes a plurality of inductors 100a-100f.

The switching devices 12a-12f and the corresponding switching devices 14a-14f form a plurality of power conversion circuits in parallel. The parallel-connected output terminal OUT is the output of the power conversion circuits. In the present embodiment, as illustrated in FIG. 1, each of the inductors 100a-100f is electrically connected to the corresponding switching devices 12a-12f and 14a-14f. Take the inductor 100a as an example, the inductor 100a is electrically connected to the switching devices 12a and 14a. The inductors 100a-100f are further connected to a parallel-connected input terminal In. In the present embodiment, the parallel-connected input terminal IN receives an input voltage Vin.

The load 16 is electrically connected to the inductor module 10 at the parallel-connected output terminal OUT. In an embodiment, the power converter 1 further includes other load components, such as but not limited to the capacitor 18 illustrated in FIG. 1 to stabilize the circuit.

In other embodiments, the inductor module 10 can be directly electrically connected to the parallel-connected input terminal IN to become input inductors and is electrically connected to the parallel-connected output terminal OUT through the switching devices. In the present embodiment, the power converter 1 is a direct current to direct current converter. However, the inductor module in the present application are not limited to be used in this type of power converter. The integrated inductor device can be used in any power converter device once the inductor module is included.

Figure 2A:
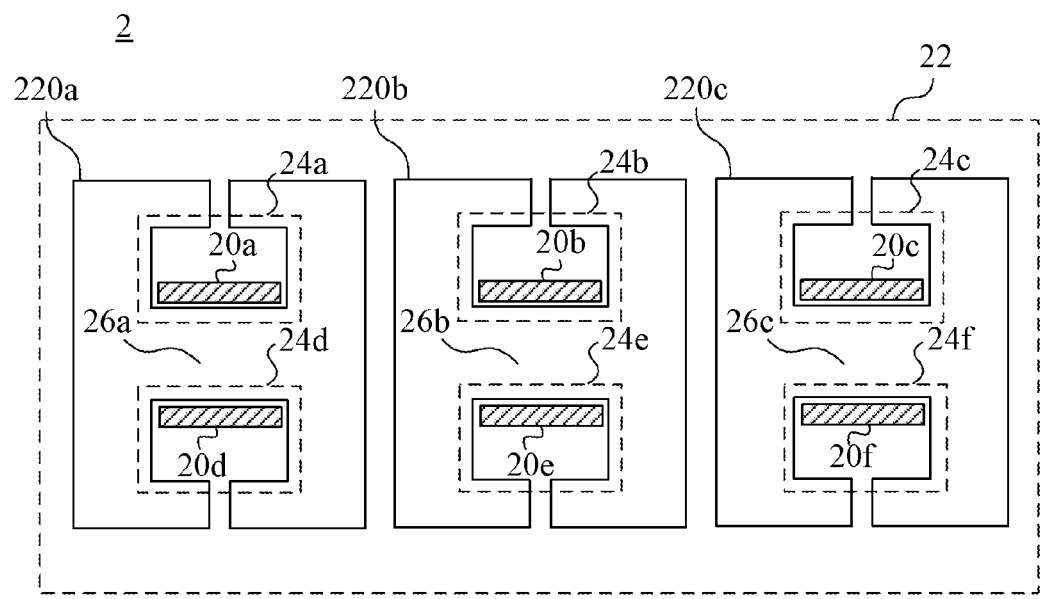
FIG. 2A is a diagram of the integrated device used in the inductor modules in an embodiment of the present disclosure.

The inductor module 10 can be implemented by an integrated device 2 illustrated in FIG. 2A. Reference now is made to FIG. 2A. FIG. 2A is a diagram of the integrated device 2 used in the inductor module 10 in an embodiment of the present disclosure. The integrated device 2 includes a plurality of windings 20a-20f and a magnetic core structure 22.

The number of the windings 20a-20f is corresponding to the number of the inductors 100a-100f in the inductor module 10 illustrated in FIG. 1. The electromagnetic process generated by the current inputted to the windings 20a-20f and the magnetic core structure 22 makes the windings 20a-20f function as the inductors 100a-100f. In an embodiment, the windings 20a-20f includes a copper sheet, a litz wire, a PCB winding, a circular conductor or a bunched conductor.

In the present embodiment, the magnetic core structure 22 includes three independent magnetic core units 220a-220c. The magnetic core units 220a-220c include the corresponding windows 24a-24f. The magnetic core unit 220a includes the windows 24a and 24d. The magnetic core unit 220b includes the windows 24b and 24e. The magnetic core unit 220c includes the windows 24c and 24f. The window 24a includes the winding 20a. The window 24b includes the winding 20b. The window 24c includes the winding 20c. The window 24d includes the winding 20d. The window 24e includes the winding 20e. The window 24f includes the winding 20f.

In the present embodiment, each pair of neighboring windows in the magnetic core units 220a-220c share a part of the magnetic core.

In the present embodiment, voltage phases of two terminals of two of the windings within the two windows in the same magnetic core units 220a-220c are substantially the same.

Figure 2B:
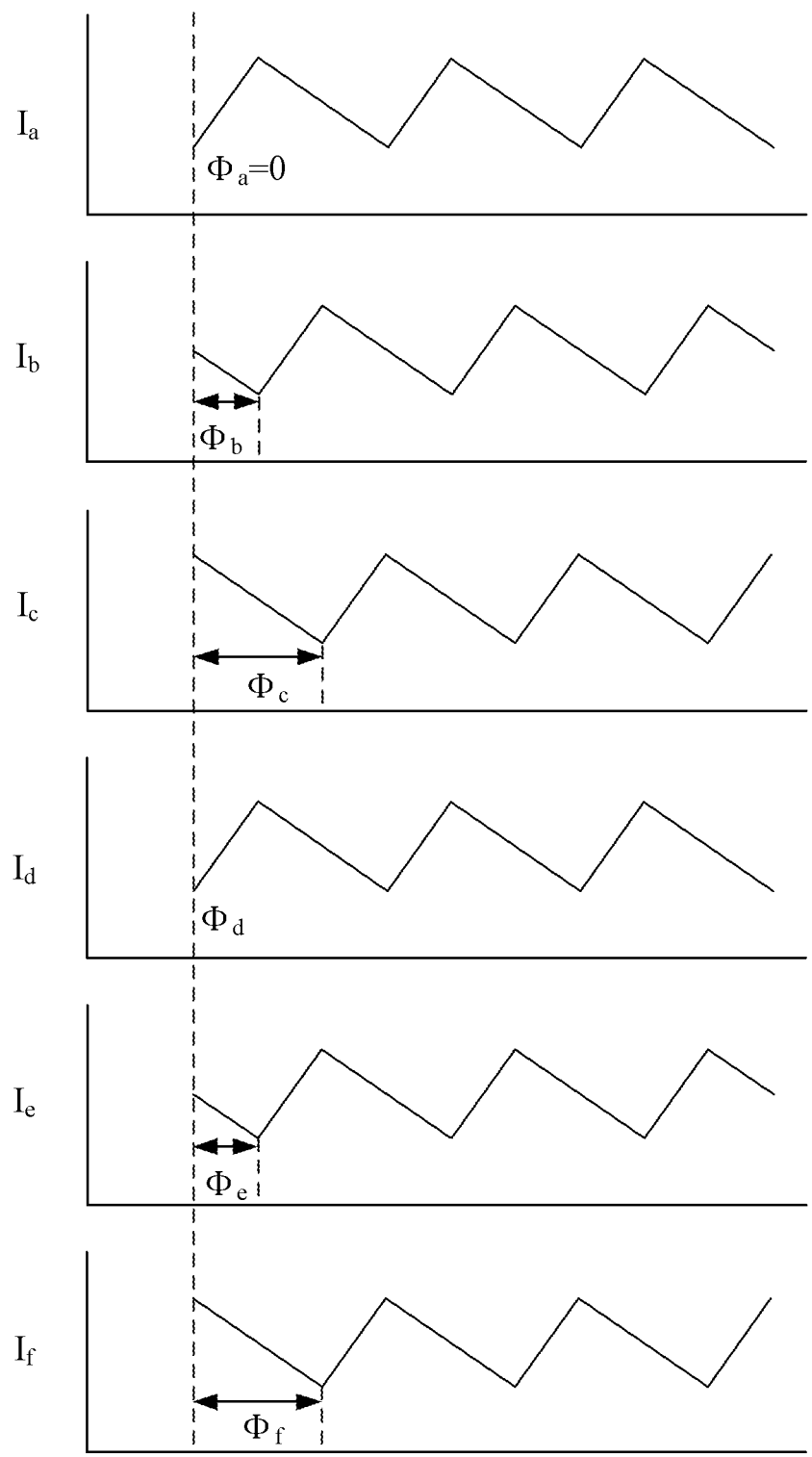
FIG. 2B is a waveform diagram of the currents corresponding to the windings in an embodiment of the present disclosure.

Reference is now made to FIG. 2B at the same time. FIG. 2B is a waveform diagram of the currents $I_a$-$I_f$ corresponding to the windings 20a-20f in an embodiment of the present disclosure. As illustrated in FIG. 2B, phases $\Phi_a$ and $\Phi_d$ of the currents $I_a$ and $I_d$ corresponding to the windings 20a and 20d in the windows 24a and 24d are the same. Phases $\Phi_b$ and $\Phi_e$ of the currents $I_b$ and $I_e$ corresponding to the windings 20b and 20e in the windows 24b and 24e are the same. Phases $\Phi_c$ and $\Phi_f$ of the currents $I_c$ and $I_f$ corresponding to the windings 20c and 20f in the windows 24c and 24f are the same. The combination of the windings between the windows of the independent magnetic core units is beneficial in decreasing the loss in the magnetic core units.

As a result, take the embodiment in FIG. 2A as an example, the windows 24a and 24d disposed in two independent magnetic cores can be integrated as a single magnetic core unit 220a as illustrated in FIG. 2A. The windows 24b and 24e disposed in two independent magnetic cores can be integrated as a single magnetic core unit 220b as illustrated in FIG. 2A. The windows 24c and 24f disposed in two independent magnetic cores can be integrated as a single magnetic core unit 220c as illustrated in FIG. 2A.

Surely, in the present embodiment, the directions of the currents in two windings are the same. The windings are used in the parallel-connected input inductors or the parallel-connected input inductors at the direct current input terminal or output terminal. However, the present disclosure does not exclude the application of the windings that allows the alternating current flowing through once the phases are substantially the same.

As a result, by using the design of the integrated device 2, two or more than two windings with the same phase can be formed in a single magnetic core unit. It is not necessary to dispose independent magnetic core units each for one of a multiple of windings. Therefore, the integrated device can shrink the size of the inductor module 10. Since the currents of the windings in different windows of the magnetic core unit are in the same direction, the direct current fluxes in the shared magnetic core part between different windows of a single magnetic core unit cancel out when the phases are substantially the same, which is beneficial in decreasing the loss in the magnetic core units.

Figure 3:
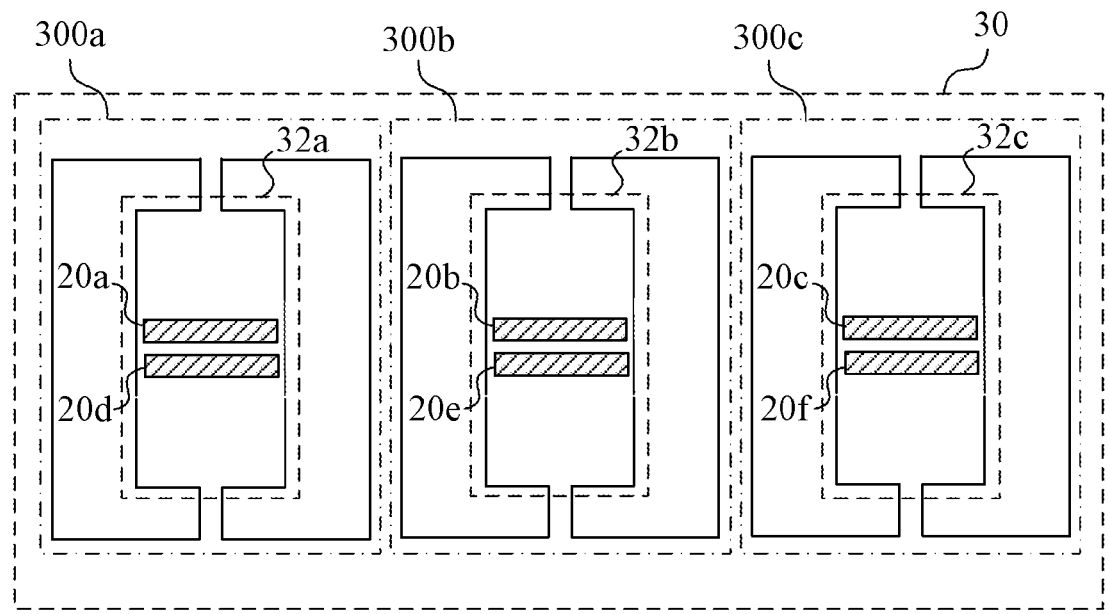
FIG. 3 is a diagram of an integrated device used in the inductor module in an embodiment of the present disclosure.

Reference is now made to FIG. 3. FIG. 3 is a diagram of an integrated device 3 used in the inductor module 10 in an embodiment of the present disclosure. The integrated device 3 includes a plurality of windings 20a-20f and a magnetic core structure 30.

In the present embodiment, the magnetic core structure 30 includes three independent magnetic core units 300a-300c. Each of the magnetic core units 300a-300c includes corresponding windows 32a-32c. The window 32a includes two windings 20a and 20d coupled to each other. The window 32b includes two windings 20b and 20e coupled to each other. The window 32c includes two windings 20c and 20f coupled to each other.

In the present embodiment, the voltage phases of two terminals of two of the windings within the same window of the same magnetic core units 300a-300c are substantially the same, i.e. a phase difference of the voltage phases is smaller than a predetermined value.

Reference is now made to FIG. 2B at the same time. FIG. 2B is a waveform diagram of the currents $I_a$-$I_f$ corresponding to the windings 20a-20f in an embodiment of the present disclosure. As illustrated in FIG. 2B, phases $\Phi_a$ and $\Phi_d$ of the currents $I_a$ and $I_d$ corresponding to the windings 20a and 20d in the windows 32a are the same. Phases $\Phi_b$ and $\Phi_e$ of the currents $I_b$ and $I_e$ corresponding to the windings 20b and 20e in the windows 32b are the same. Phases $\Phi_c$ and $\Phi_f$ of the currents $I_c$ and $I_f$ corresponding to the windings 20c and 20f in the windows 32c are the same. In an embodiment, when the following conditions are met, a multiple of magnetic cores can be integrated to a single magnetic core: (1) the magnetic core includes N windows, wherein N≥2; (2) one of the windows includes M windings, wherein M≥2, the voltage phases of the two terminals of the M windings are basically the same, the voltage phase difference of the two terminals has to be smaller than a predetermined value; (3) the voltage difference of the two terminals of the windings in different windows is larger than the predetermined value mentioned above.

As a result, take the embodiments in FIG. 3 and FIG. 2B as an example, the windows 24a and 24d disposed in two independent magnetic cores can be integrated to a single magnetic core unit 300a illustrated in FIG. 3. The windows 24b and 24e disposed in two independent magnetic cores can be integrated to a single magnetic core unit 300b illustrated in FIG. 3. The windows 24c and 24f disposed in two independent magnetic cores can be integrated to a single magnetic core unit 300c illustrated in FIG. 3.

Surely, in the present embodiment, the directions of the currents in two windings are the same. The windings are used in the parallel-connected input inductors or the parallel-connected input inductors at the direct current input terminal or output terminal. However, the present disclosure does not exclude the application of the windings that allows the alternating current flowing through once the phases are substantially the same.

In an embodiment, the predetermined value d$\Phi$max can be expressed as:

$$d\Phi_{max}=(360 \times L_k \times (I_{max}-I_2))/(V_{in} \times T)$$

Take the windings 20a and 20d as an example, $V_{in}$ is the input voltage $V_{in}$ received by the parallel-connected input terminal IN in the window 32a. $L_K$ is a leakage inductance of two of the inductor modules 100a and 100d corresponding to two of the windings 20a and 20d within the window 32a. $I_{max}$ is a maximum current allowed to be passed by the switching devices 12a and 12d corresponding to each of the inductor modules 100a and 100d within the same window 32a. $I_2$ is a current that flows through each of the windings 20a and 20d corresponding to two of the inductor modules 100a and 100d in phase within the same window 32a. T is a period of a voltage or a current of the two terminals of the windings 20a and 20d within the same window.

Figure 2C:
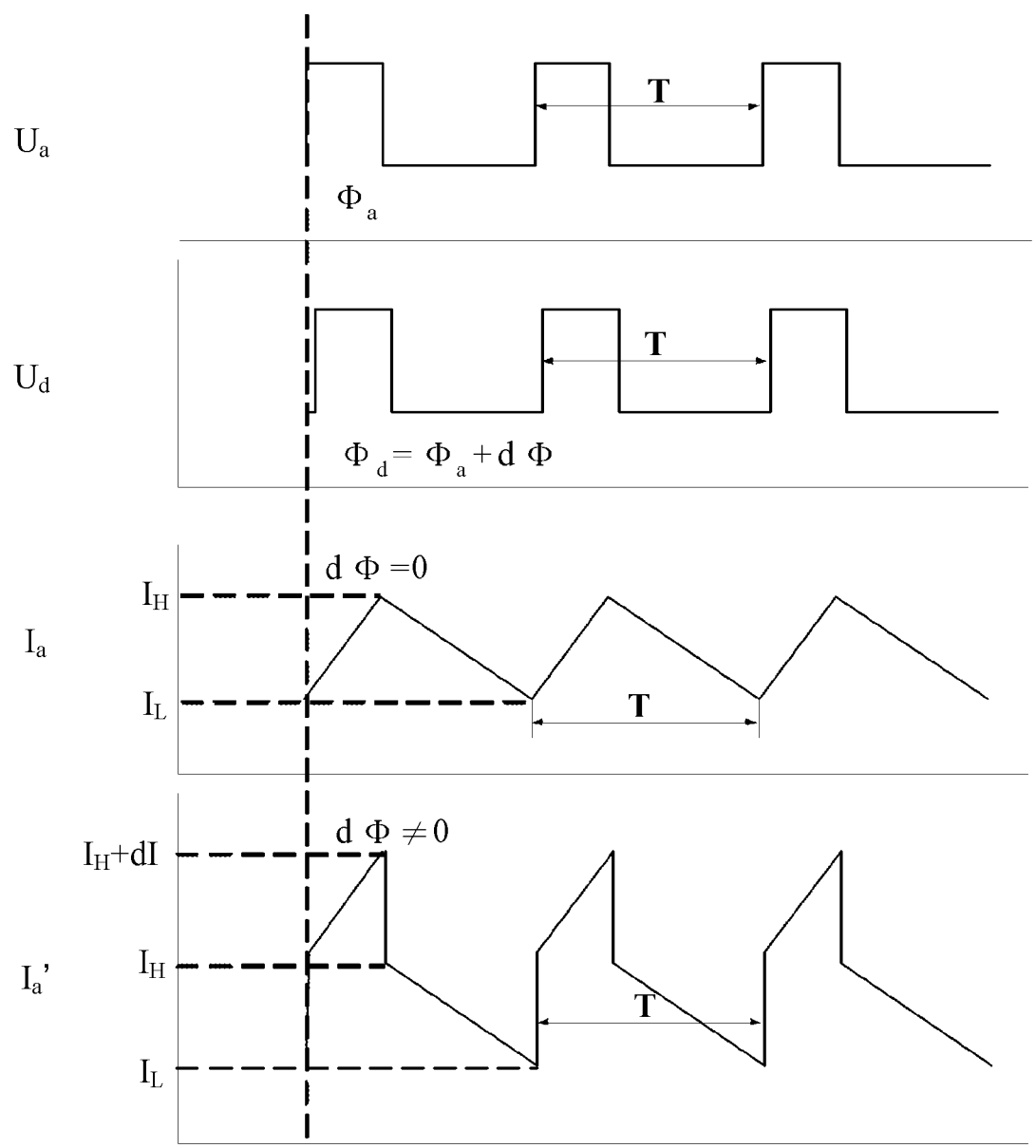
FIG. 2C is a diagram of waveforms of the winding voltages and the winding currents when the power converter operates in a continuous conduction mode in an embodiment of the present disclosure.
Figure 2D:
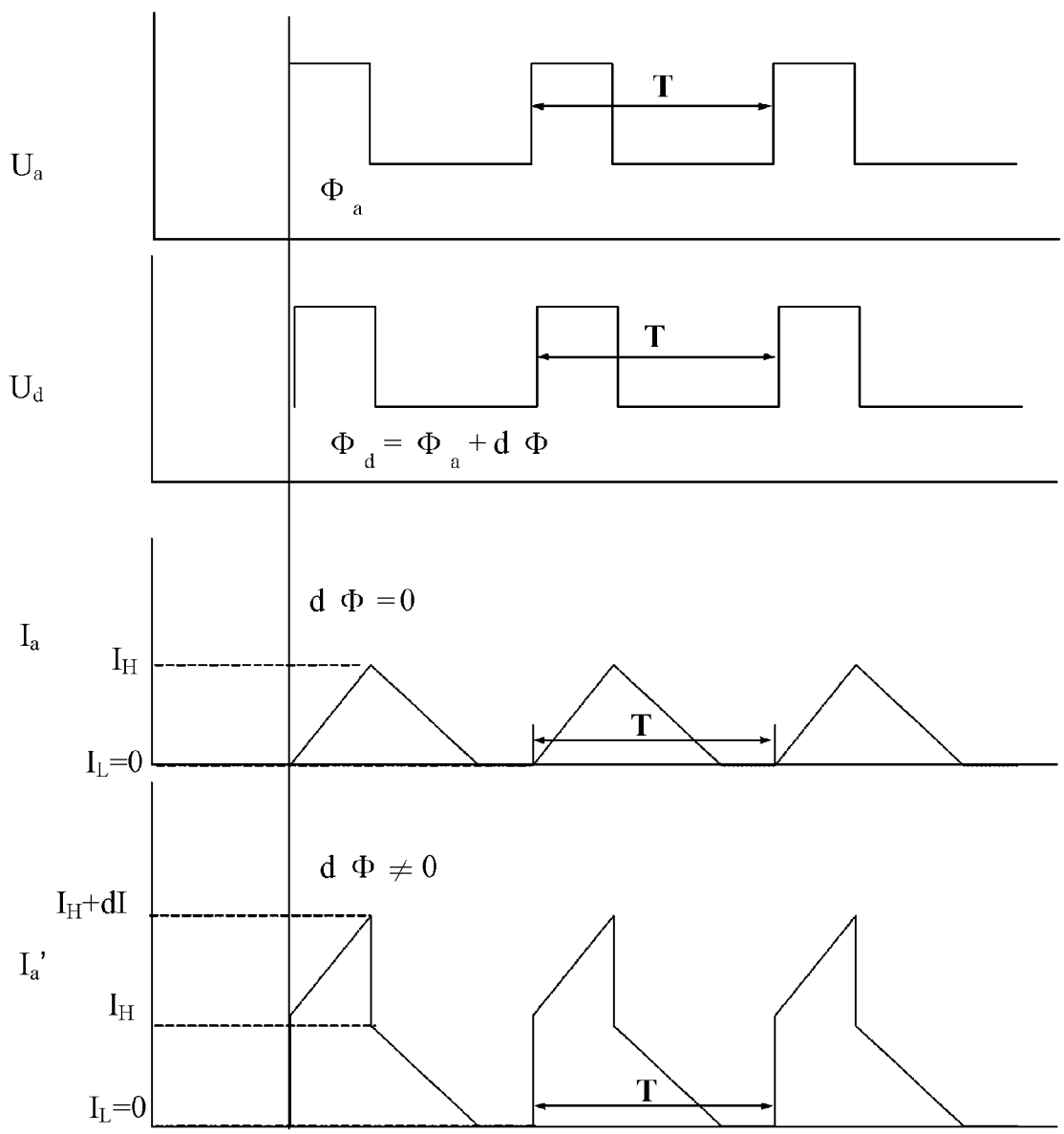
FIG. 2D is a diagram of waveforms of the winding voltages and the winding currents when the power converter operates in a discontinuous conduction mode in an embodiment of the present disclosure.

In order to give a clear description of the influence of the phase difference between the windings on the winding currents, reference is now made to FIG. 2C and FIG. 2D. FIG. 2C is a diagram of waveforms of the winding voltages and the winding currents when the power converter 1 operates in a continuous conduction mode in an embodiment of the present disclosure. FIG. 2D is a diagram of waveforms of the winding voltages and the winding currents when the power converter 1 operates in a discontinuous conduction mode in an embodiment of the present disclosure.

More specifically, FIG. 2C is a diagram illustrating the influence of the voltage phase differences of the two terminals of the two windings within the same window (e.g. the windings 20a and 20d illustrated in FIG. 3) on the winding currents when switching devices 12a-12f and 14a-14f of the power converter 1 in FIG. 1 operate in the continuous conduction mode.

As illustrated in FIG. 2C, the voltage of one of the windings is $U_a$ and has a phase of $\Phi_a$. The voltage of the other one of the windings is $U_d$ and has a phase of $\Phi_d$. If the phase difference between the two windings is d$\Phi$, the relation between the phase $\Phi_a$ and the phase $\Phi_d$ is expressed as $\Phi_d=\Phi_a+d\Phi$.

When the phase difference d$\Phi$ is 0, the waveform of the winding current $I_a$ is the triangular wave as illustrated in FIG. 2C and has the amplitude between $I_L$ and $I_H$. However, when the phase difference d$\Phi$ is not 0, a circulation exists between the two coupled windings and results in larger current in the inductor. The maximum of the current in the inductor becomes $I_H$+dI, wherein dI=$V_{in}$*dt/$L_k$. As a result, dI needs to meet the condition of dI<$I_{max}$-$I_2$, i.e. d$\Phi$≤(360× $L_k \times (I_{max}-I_2))/(V_{in} \times T)$. $V_{in}$ is the input voltage received by the inductor. T is a period of the voltage or the current of the two terminals of the windings within the same window. The waveform of the generated winding current $I_a'$ is influenced thereby and changes to generate an impulse having a current value up to $I_H$+dI.

More specifically, FIG. 2D is a diagram illustrating the influence of the voltage phase differences of the two terminals of the two windings within the same window (e.g. the windings 20a and 20d illustrated in FIG. 3) on the winding currents when switching devices 12a-12f and 14a-14f of the power converter 1 in FIG. 1 operate in the discontinuous conduction mode.

As illustrated in FIG. 2D, the voltage of one of the windings is $U_a$ and has a phase of $\Phi_a$. The voltage of the other one of the windings is $U_d$ and has a phase of $\Phi_d$. If the phase difference between the two windings is d$\Phi$, the relation between the phase $\Phi_a$ and the phase $\Phi_d$ is expressed as $\Phi_d=\Phi_a+d\Phi$.

When the phase difference d$\Phi$ is 0, the waveform of the winding current $I_a$ is the triangular wave as illustrated in FIG. 2D and has the amplitude between $I_L$ and $I_H$, in which the value of $I_L$ is 0. However, when the phase difference d$\Phi$ is not 0, the waveform of the generated winding current $I_a'$ is influenced thereby and changes to generate an impulse having a current value up to $I_H$+dI.

As a result, by using the design of the integrated device 3, two or more than two windings with the same phase can be formed in a single magnetic core unit. It is not necessary to dispose independent magnetic core units each for one of a multiple of windings. Therefore, the integrated device can shrink the size of the inductor module 10. The degree of the integration of the inductor components can be increased.

Comparing the embodiment in FIG. 2A and the embodiment in FIG. 3, the embodiment in FIG. 3 is more beneficial in shrinking the size of the magnetic core than the embodiment in FIG. 2A. In FIG. 3, one magnetic core unit only has one window having two coupled windings. However, in the type of the embodiment in FIG. 2A, one magnetic core unit includes two windows each having only one winding. These two windings are disposed in separated windows and are not coupled. The phase difference of the currents between the non-coupled windings is not as strict as the phase difference of the currents between the coupled windings. As a result, the phase difference of the currents between the non-coupled windings is allowed to be larger. However, in order to decrease the loss of the magnetic core, the phase of the currents in the two windings in the same magnetic unit illustrated in the preferable embodiment in FIG. 2A is substantially the same.

Figure 4:
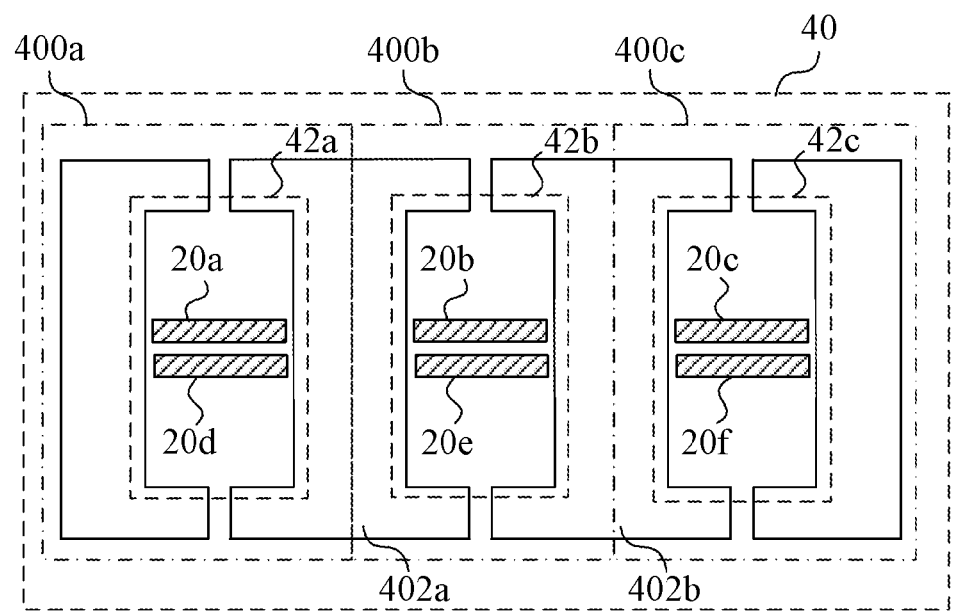
FIG. 4 is a diagram of the integrated device used in the inductor module in an embodiment of the present disclosure.

Reference is now made to FIG. 4. FIG. 4 is a diagram of an integrated device 4 used in the inductor module 10 in an embodiment of the present disclosure. The integrated device 4 includes a plurality of windings 20a-20f and a magnetic core structure 40.

In the present embodiment, the magnetic core structure 40 includes three magnetic core units 400a-400c. Each of the magnetic core units 400a-400c includes corresponding windows 42a-42c. The window 42a includes two windings 20a and 20d coupled to each other. The window 42b includes two windings 20b and 20e coupled to each other. The window 42c includes two windings 20c and 20f coupled to each other.

In the present embodiment, the voltage phases of two terminals of any two of the windings within the same window are substantially the same. For example, the voltage phase of the two terminals of the two windings 20a and 20d corresponding to the window 42a is substantially the same, and the voltage phase difference between the two terminals is smaller than the predetermined value.

Figure 5:
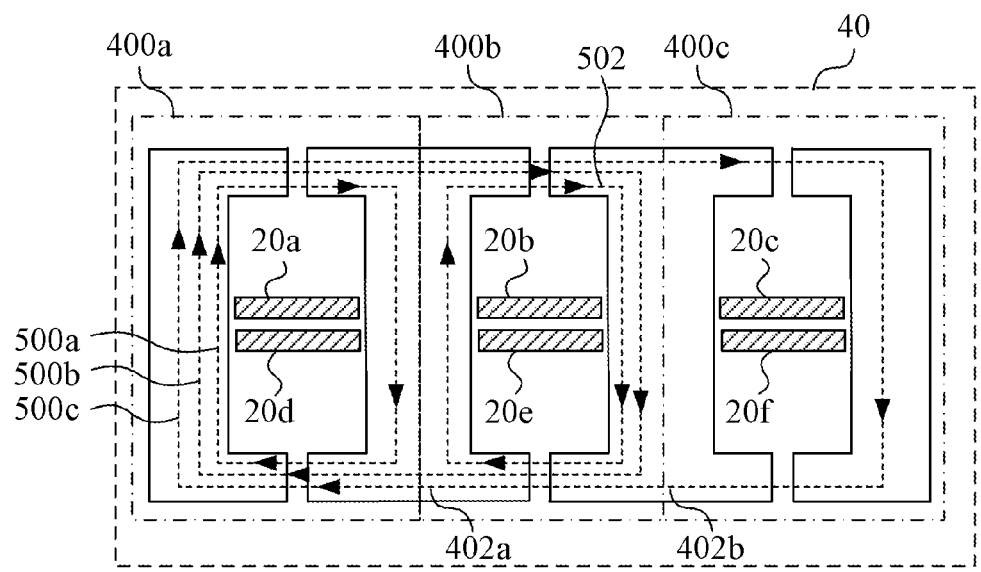
FIG. 5 is a diagram of a part of the magnetic fluxes of the integrated device illustrated in FIG. 4 in an embodiment of the present disclosure.

In the present embodiment, the magnetic core structure 40 has shared magnetic core parts 402a and 402b each disposed between the two neighboring windows 42a and 42b and between the two neighboring windows 42b and 42c. The currents in the windings of the neighboring windows are in the same direction such that the directions of the direct current magnetic fluxes in the edges of the two neighboring windows are opposite. Hence, the neighboring edges of the neighboring windows can be fabricated as the shared magnetic core parts 402a and 402b, which is more beneficial in shrinking the size of the magnetic core structure 40. In order to make the canceling effect of the direct current magnetic fluxes more obvious, the magnetic resistance of the shared magnetic core parts can be smaller than that of the other non-shared magnetic core parts in the same window. In an embodiment, the shared magnetic core parts include magnetic material different from the material used to fabricate the other non-shared magnetic core parts in the same window. Further, the magnetic material has a magnetic permeability larger than the magnetic permeability of the non-shared core parts. A description is made by using the magnetic core part 402 as an example. Since the magnetic core part 402 is shared by the two neighboring windows 42a and 42b, the magnetic core part 402 can include the magnetic material different from the material used to fabricate the other non-shared magnetic core parts in the same window 42a. In the present embodiment, the window 42a is fabricated by a regular geometrical pattern, which is a rectangle. Hence, the window 42a is fabricated by four edges. The magnetic material included in the magnetic core part 402 can be different from the material used to fabricate the other three edges. Surely, the magnetic core part 402 is also a part of the window 42b. For the same rationale, the magnetic material included in the magnetic core part 402 can be different from the material used to fabricate the other two edges of the window 42b. Surely, the material included in the magnetic core part can be fabricated by two or more than two kinds of magnetic material once the magnetic resistance of the shared magnetic core part is smaller than the magnetic resistance of the other non-shared magnetic core parts within the same window. Comparing the present embodiment to the previous embodiment, a plurality of independent magnetic core units in the previous embodiment are used to be integrated into the magnetic core structure of a whole magnetic core, and the plurality of independent magnetic core units share parts of the magnetic cores. Reference is now made to FIG. 5. FIG. 5 is a diagram of a part of the magnetic fluxes of the integrated device 4 illustrated in FIG. 4 in an embodiment of the present disclosure.

As illustrated in FIG. 5, the windings 20a and 20d generate three magnetic fluxes 500a-500c in the magnetic core structure 40. The magnetic flux 500a surrounds the magnetic core unit 400a, the magnetic flux 500b surrounds the magnetic core units 400a and 400b and the magnetic flux 500c surrounds the magnetic core units 400a-400c. The main magnetic flux that corresponds to the magnetic core unit 400a is the magnetic flux 500a.

Similarly, the windings 20b and 20e generate three magnetic fluxes in the magnetic core structure 40, wherein only the main magnetic flux 502 corresponding to the magnetic core unit 400b is exemplarily illustrated in FIG. 5.

For the magnetic flux 500a, the loss of the magnetic core in the shared magnetic core part decreases due to the existence of the magnetic flux 502 in the opposite direction, which is beneficial to fabricate the shared magnetic core part with an even smaller size such that the whole size of the magnetic core structure 40 can be decreased.

Figure 6:
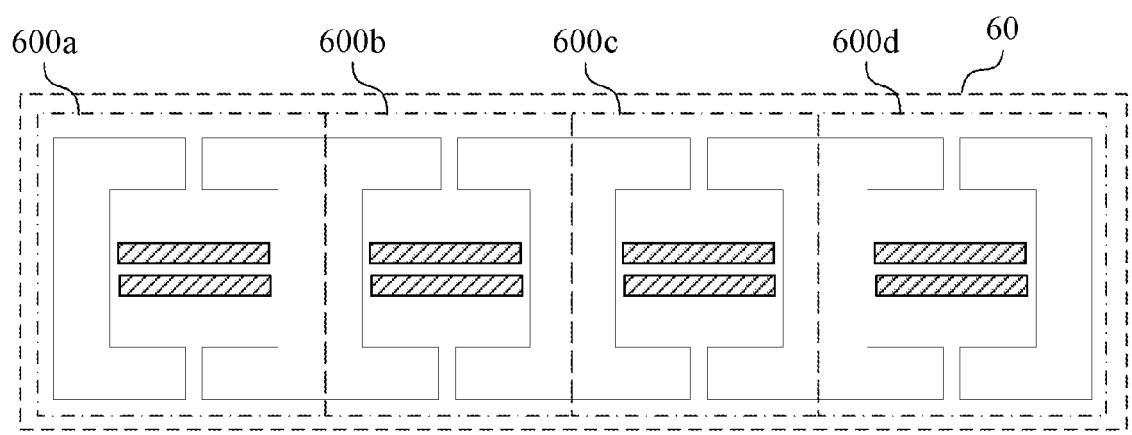
FIG. 6 is a diagram of the integrated device used in the inductor module in an embodiment of the present disclosure.

Reference is now made to FIG. 6. FIG. 6 a diagram of an integrated device 6 used in the inductor module 10 in an embodiment of the present disclosure.

In the previous embodiments, three magnetic core units are used as the examples. However, in other embodiments, the magnetic core structure 60 can include four magnetic core units 600a-600d or more magnetic core units as illustrated in the integrated device 6 in FIG. 6.

Figure 7:
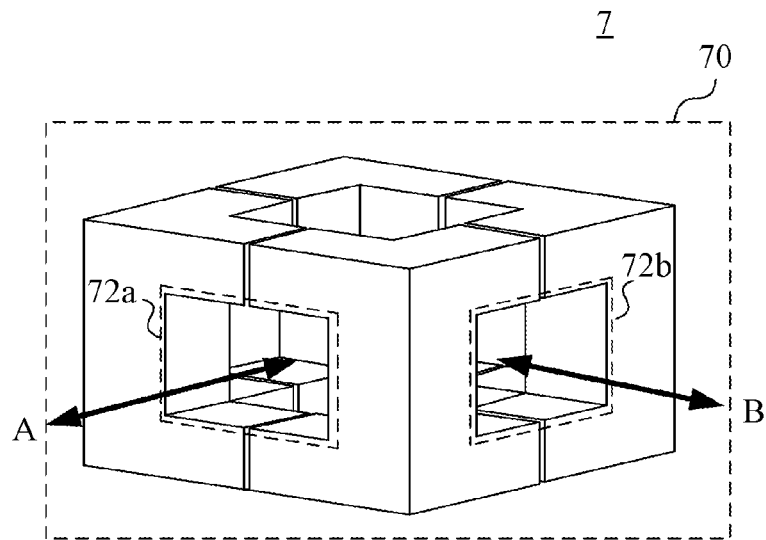
FIG. 7 is a diagram of the integrated device used in the inductor module in an embodiment of the present disclosure.

Reference is now made to FIG. 7. FIG. 7 a diagram of an integrated device 7 used in the inductor module 10 in an embodiment of the present disclosure.

In an embodiment, the integrated device 7 includes a three-dimensional magnetic core structure 70 as illustrated in FIG. 7. In FIG. 7, only the windows 72a and 72b included in the magnetic core structure 70 are exemplarily illustrated. Actually, a window (not illustrated) is disposed at a side opposite to the window 72a, and another window (not illustrated) is disposed at a side opposite to the window 72b. A surface formed by each of the windows has a corresponding axis, such as the axis A and axis B respectively vertical to the surfaces formed by the windows 72a and 72b illustrated in FIG. 7.

In the present embodiment, the axes of the two neighboring windows are vertical to each other. For example, the axes A and B of the windows 72a and 72b are vertical to each other. Moreover, and the axes of the windows on the opposite sides are parallel to each other. For example, the axis A of the window 72a and the axis (not illustrated) of the window in opposite to the window 72a are parallel to each other. Actually, when the integrated device 7 is a symmetrical cubic, the axes of the windows on the opposite sides are the same.

In the magnetic core structures of the embodiments illustrated in FIG. 5 and FIG. 6, the axes of the windows of the magnetic core unit are basically parallel to each other. However, the three-dimensional magnetic core structure 70 further increases the flexibility of the usage of the space of the magnetic core structure.

Figure 8:
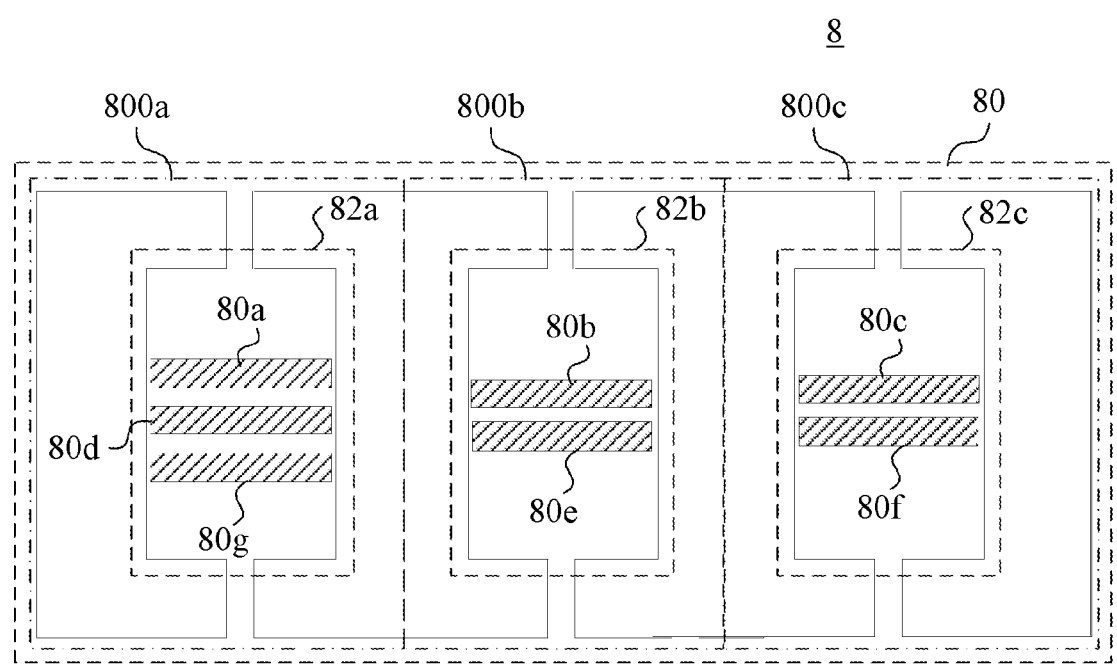
FIG. 8 is a diagram of the integrated device used in the inductor module in an embodiment of the present disclosure.

Reference is now made to FIG. 8. FIG. 8 a diagram of an integrated device 8 used in the inductor module 10 in an embodiment of the present disclosure. The integrated device 8 includes a plurality of windings 80a-80f and a magnetic core structure 80.

In the present embodiment, the magnetic core structure 80 includes three magnetic core units 800a-800c. Each of the magnetic core units 800a-800c includes corresponding windows 82a, 82b and 82c. In the present embodiment, each of the windows 82a, 82b and 82c includes different numbers of windings. For example, the window 82a includes three coupled windings 80a, 80d and 80g. The window 82b includes two coupled windings 80b and 80e. The window 82c includes two windings 80c and 80f.

Figure 9:
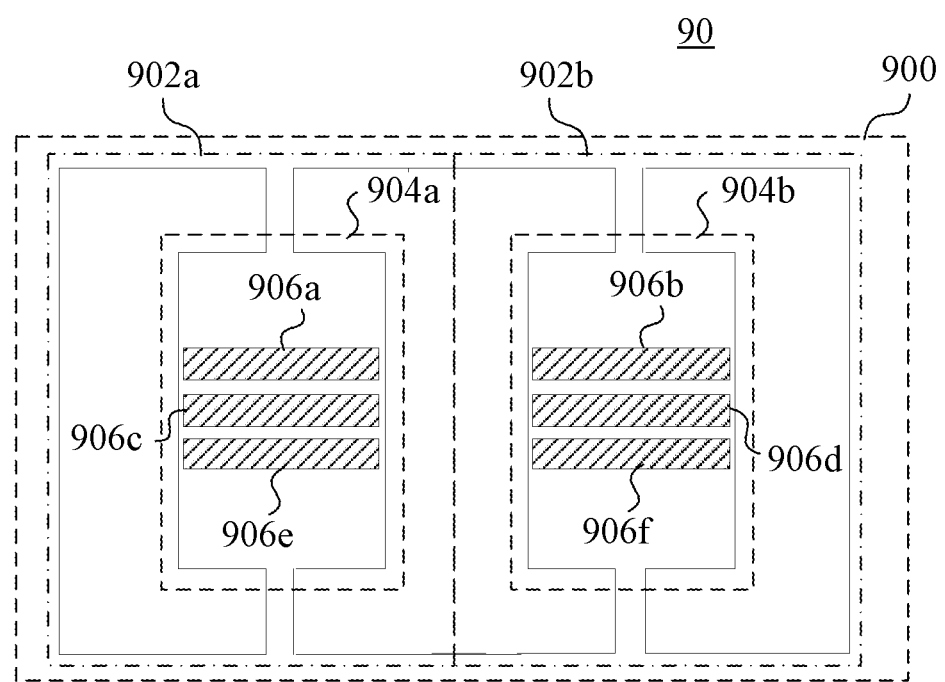
FIG. 9 is a diagram of the integrated device used in the inductor module in an embodiment of the present disclosure.

Reference is now made to FIG. 9. FIG. 9 a diagram of an integrated device 90 used in the inductor module 10 in an embodiment of the present disclosure. The integrated device 90 includes a plurality of windings 906a-906f and a magnetic core structure 900.

In the present embodiment, the magnetic core structure 900 includes two magnetic core units 902a and 902b. Each of the magnetic core units 902a and 902b includes corresponding windows 904a and 904b. In the present embodiment, the window 904a includes three coupled windings 906a, 906c and 906e. The window 904b includes three coupled windings 906b, 906d and 906f.

In the types of embodiments illustrated in FIG. 8 and FIG. 9, when each the windows in the magnetic core units includes more than two windings, the phases of the windings within the same window are basically the same, and the phase difference between any two windings needs to be smaller than the predetermined value. The calculation of the predetermined value is described in the embodiments mentioned above. Therefore, no more detail description is made herein.

As a result, when the phase difference of the voltages between the windings within the same window is controlled to be smaller than or equal to the predetermined phase difference, the integrated device of the present disclosure can integrate a multiple of windings having substantially the same phase into a single magnetic core unit without influencing the winding currents too much. It is not necessary to dispose a multiple of independent magnetic core units each for one of a multiple of windings. Hence, the size of the inductor modules can be shrunk to further shrink the size of the power converter.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A device integrating a plurality of inductors in parallel, comprising:
   a plurality of windings, wherein a number of the windings corresponds to a number of the inductors; and
   a magnetic core structure comprising a plurality of windows, wherein each window comprises at least two windings coupled with each other;
   wherein voltage phases of two terminals of any two windings within the same window are substantially the same, and a phase difference of the voltage phases is smaller than a predetermined value;
   wherein each of the plurality of inductors is coupled to at least one switching device, the predetermine value is expressed as:

$$d\Phi_{max}=(360\times L_k\times(I_{max}-I_2))/(V_{in}\times T)$$

wherein $V_{in}$ is an input voltage received by a parallel-connected input of a power converter within the same window, $L_K$ is a leakage inductance of two of the inductors corresponding to two of the windings within the same window, $I_{max}$ is a maximum current allowed to flow through the switching device corresponding to each of the inductors within the same window, $I_2$ is a current that flows through each of the windings corresponding to two of the inductors in phase within the same window, and T is a period of a voltage or a current of the two terminals of the windings within the same window.

2. The device of claim 1, wherein the winding currents in the different windows have the same current direction, and the voltage phase difference is larger than the predetermined value $d\Phi_{max}$.

3. The device of claim 1, wherein the magnetic core structure comprises at least one shared core part between two neighboring windows.

4. The device of claim 3, wherein a main flux is generated by the winding in each window, and a first magnetic resistance of the main flux located in the shared core part is smaller than a second magnetic resistance of the main flux located in the other core part rather than the shared core part.

5. The device of claim 4, wherein the shared core part comprises a magnetic material, of which the magnetic permeability is larger than that of the other core part.

6. The device of claim 1, wherein axes of the windows of the magnetic core structure are either parallel or vertical to each other.

7. The device of claim 1, wherein the winding comprises a copper sheet, a litz wire, a PCB winding, a circular conductor wire or a bunched conductor.

8. A device integrating a plurality of inductors in parallel, comprising:
   a plurality of windings, wherein a number of the windings corresponds to a number of the inductors; and
   a plurality of independent magnetic core units, wherein each magnetic core unit comprises at least two windows, and each window comprises at least one of the windings, and two neighboring windows share a part of magnetic core;
   wherein voltage phases of two terminals of the windings of any two windows of the same independent magnetic core unit are substantially the same, and a phase difference of the voltage phases is smaller than a predetermined value;
   wherein each one of the inductors is coupled to at least one switching device, the predetermine value is expressed as:

$$d\Phi_{max}=(360\times L_k\times(I_{max}-I_2))/(V_{in}\times T)$$

wherein $V_{in}$ is an input voltage received by a parallel-connected input of a power converter within the same window, $L_K$ is a leakage inductance of two of the inductors corresponding to two of the windings within the same window, $I_{max}$ is a maximum current allowed to flow through the switching device corresponding to each of the inductors within the same window, $I_2$ is a current that flows through each of the windings corresponding to two of the inductors in phase within the same window, and T is a period of a voltage or a current of the two terminals of the windings within the same window.

9. A power converter comprising:
a plurality of power conversion circuits in parallel, each of which comprises at least one switching device;
a device integrating a plurality of inductors in parallel, comprising:
  a plurality of windings, wherein a number of the windings correspond to a number of the inductors; and
  a magnetic core structure comprising a plurality of windows, wherein each window comprises at least two windings coupled with each other, wherein voltage phases of two terminals of any two windings within the same window are substantially the same, and a phase difference of the voltage phases is smaller than a predetermined value; and
a load electrically connected to the output terminals of the plurality of power conversion circuits;
wherein each of the inductors is connected to the at least one switching device, the predetermine value is expressed as:

$$d\Phi_{max}=(360 \times L_k \times (I_{max}-I_2))/(V_{in} \times T)$$

wherein $V_{in}$ is an input voltage received by a parallel-connected input of the power converter within the same window, $L_K$ is a leakage inductance of two of the inductors corresponding to two of the windings within the same window, $I_{max}$ is a maximum current allowed to flow through the switching device corresponding to each of the inductors within the same window, $I_2$ is a current that flows through each of the windings corresponding to two of the inductors in phase within the same window, and T is a period of a voltage or a current of the two terminals of the windings within the same window.

10. The power converter of claim 9, wherein the winding currents in the different windows have the same current direction, and the voltage phase difference is larger than the predetermined value $d\Phi_{max}$.

11. The power converter of claim 9, wherein the magnetic core structure comprises at least one shared core part between two neighboring windows.

12. The power converter of claim 11, wherein a main flux is generated by the winding in each window, and a first magnetic resistance of the main flux located in the shared core part is smaller than a second magnetic resistance of the main flux located in the other core part rather than the shared core part.

13. The power converter of claim 12, wherein the shared core part comprises magnetic material, of which the magnetic permeability is larger than that of the other core part.

14. The power converter of claim 9, wherein axes of the windows of the magnetic core structure are either parallel or vertical to each other.

15. A power converter, comprising:
a plurality of power conversion circuit in parallel, each of which comprises at least one switching device;
a device integrating a plurality of inductors in parallel, comprising:
  a plurality of windings, wherein a number of the windings corresponds to a number of the inductors; and
  a plurality of independent magnetic core units, wherein each magnetic core unit comprises at least two windows, and each window comprises at least one of the windings, and two neighboring windows share a part of magnetic core, wherein voltage phases of two terminals of the windings of any two windows of the same independent magnetic core unit are substantially the same, and a phase difference of the voltage phases is smaller than a predetermined value; and
a load electrically connected to the output terminals of the plurality of power conversion circuits;
wherein each of the plurality of inductors is coupled to the at least one switching device, the predetermine value is expressed as:

$$d\Phi_{max}=(360 \times L_k \times (I_{max}-I_2))/(V_{in} \times T)$$

wherein $V_{in}$ is an input voltage received by a parallel-connected input of the power converter within the same window, $L_K$ is a leakage inductance of two of the inductors corresponding to two of the windings within the same window, $I_{max}$ is a maximum current allowed to flow through the switching device corresponding to each of the inductors within the same window, $I_2$ is a current that flows through each of the windings corresponding to two of the plurality of inductors in phase within the same window, and T is a period of a voltage or a current of the two terminals of the windings within the same window.

* * * * *